(12) United States Patent
Fields

(10) Patent No.: US 6,434,338 B1
(45) Date of Patent: Aug. 13, 2002

(54) CAMERA WITH DUAL-FUNCTION BATTERY/MANUAL OPERATING BUTTON UNIT

(75) Inventor: Roger A. Fields, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/563,074

(22) Filed: Apr. 24, 2000

(51) Int. Cl.[7] .......................... G03B 7/26; G03B 17/02; G03B 17/38
(52) U.S. Cl. ...................... 396/301; 396/205; 396/502; 396/539
(58) Field of Search ................... 396/205, 206, 396/277, 278, 279, 301, 539, 502, 6; 348/372, 376; 352/243

(56) References Cited

U.S. PATENT DOCUMENTS

| | | | |
|---|---|---|---|
| 916,833 A | 3/1909 | Blau | |
| 2,120,238 A | 6/1938 | Brush | |
| 2,150,644 A | 3/1939 | Batcheller | |
| 3,524,393 A | * 8/1970 | Greger et al. | 396/539 |
| 4,232,958 A | * 11/1980 | Fukahori et al. | 396/502 |
| 4,241,384 A | 12/1980 | Diziere | |
| 4,422,131 A | 12/1983 | Clanton et al. | |
| 5,315,336 A | * 5/1994 | Suzuka et al | 396/539 |
| 5,601,939 A | * 2/1997 | Zander | 396/539 |
| 5,630,193 A | 5/1997 | Miyake et al. | |
| 5,842,071 A | * 11/1998 | Stanchus et al. | 396/539 |
| 6,151,455 A | * 11/2000 | Mikami et al. | 396/205 |
| 6,175,690 B1 | * 1/2001 | Chung et al. | 396/205 |

FOREIGN PATENT DOCUMENTS

JP          55-127531     * 10/1980

* cited by examiner

Primary Examiner—Alan A. Mathews
(74) Attorney, Agent, or Firm—Roger A. Fields

(57) ABSTRACT

A camera comprising a power source battery, and an exteriorly accessible operating button that is manually moveable to initiate at least one operation in the camera, is characterized in that the battery and the operating button are a simultaneously movable unit; and a pair of electrical leads maintain individual conductive contact with the battery when the battery and the button are simultaneously moved. The battery and the operating button can be the same one-piece entity, or alternatively the battery can be a separate entity that is contained in a chamber in the operating button. Examples of an operating button are a flash on-off button, a shutter release button, and a power on-off button.

13 Claims, 6 Drawing Sheets

US 6,434,338 B1

CAMERA WITH DUAL-FUNCTION BATTERY/MANUAL OPERATING BUTTON UNIT

FIELD OF THE INVENTION

The invention relates generally to the field of photography, and in particular to cameras. More specifically, the invention relates to a camera with a power source battery and an exteriorly accessible operating button such as a shutter release button or a flash on-off button that is manually moveable to initiate at least one operation in the camera.

BACKGROUND OF THE INVENTION

It is well known for a camera to include a power source battery and an exteriorly accessible operating button such as a shutter release button or a flash on-off button that is manually moveable to initiate at least one operation in the camera. Typically, the battery is received in a bottom-loading or end-loading chamber and the operating button is exteriorly accessible at a front, top or rear opening.

SUMMARY OF THE INVENTION

A camera comprising a power source battery, and an exteriorly accessible operating button that is manually moveable to initiate at least one operation in the camera, is characterized in that:

the battery and the operating button are a simultaneously movable unit; and a pair of electrical leads maintain individual conductive contact with the battery when the battery and the button are simultaneously moved.

The battery and the operating button can be the same one-piece entity, or the battery can be a separate entity that is contained in a chamber in the operating button.

Examples of an operating button are a flash on-off button, a shutter release button, and a power on-off button.

DETAILED DESCRIPTION OF THE INVENTION

The invention is disclosed as being embodied preferably in a camera. Because the features of a are generally known, the description which follows is directed in particular only to those elements forming part of or cooperating directly with the disclosed embodiment. It is to be understood, however, that other elements may take various forms known to a person of ordinary skill in the art.

Figure 1:
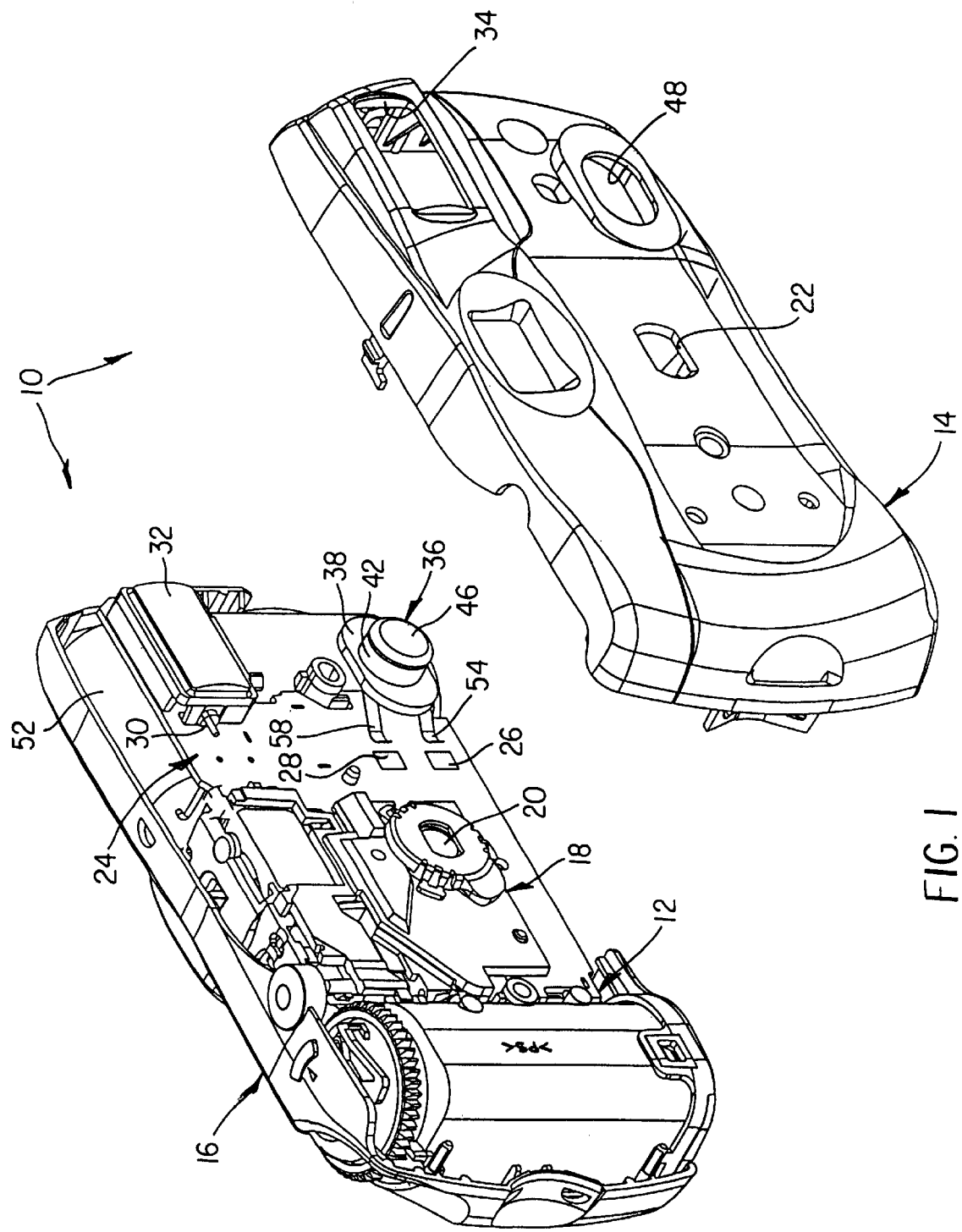
FIG. 1 is a front partially -exploded perspective view of a camera including a dual-function battery/manual operating button unit according to one embodiment of the invention.
Figure 2:
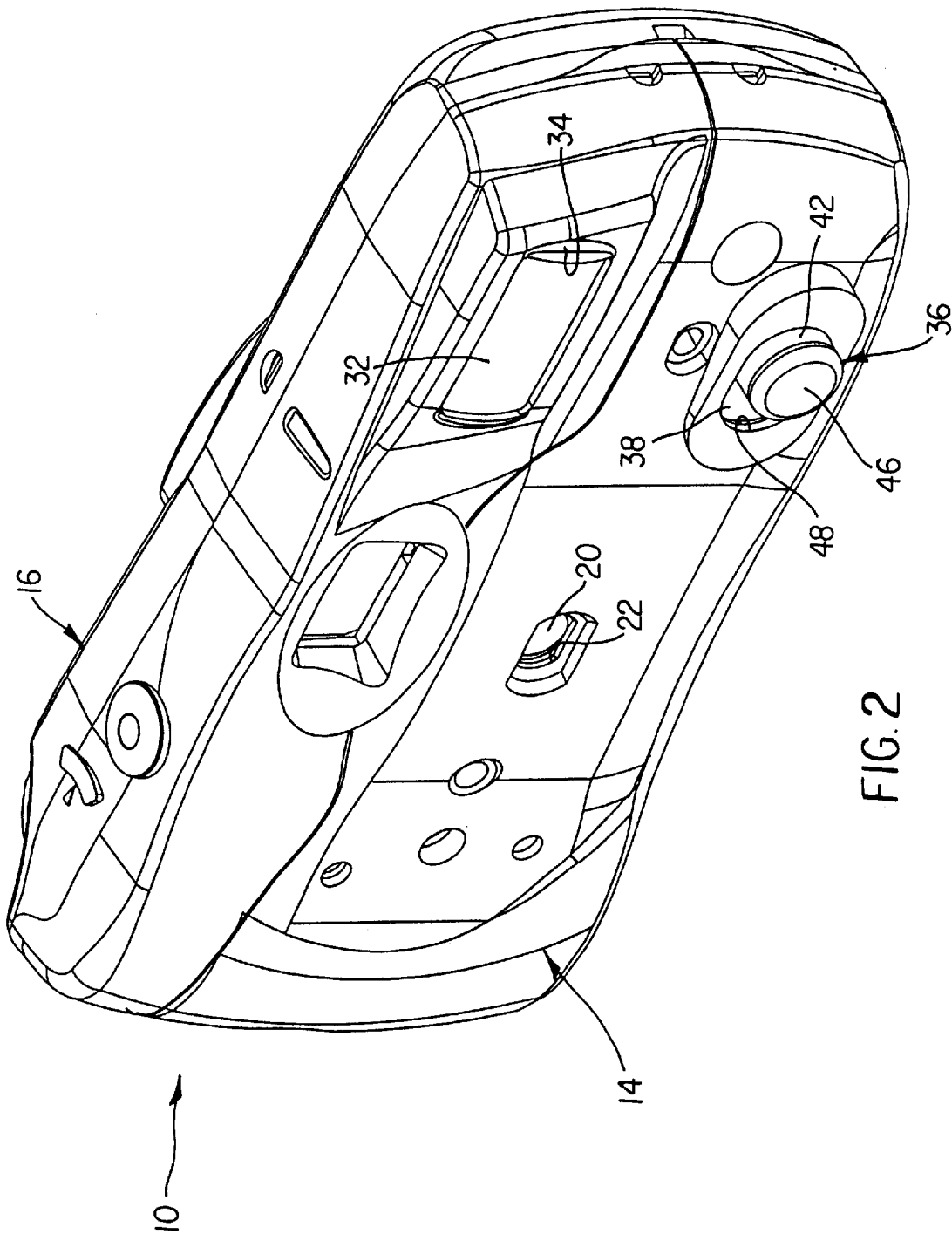
FIG. 2 is a front assembled perspective view of the camera shown in FIG. 1.
Figure 3:
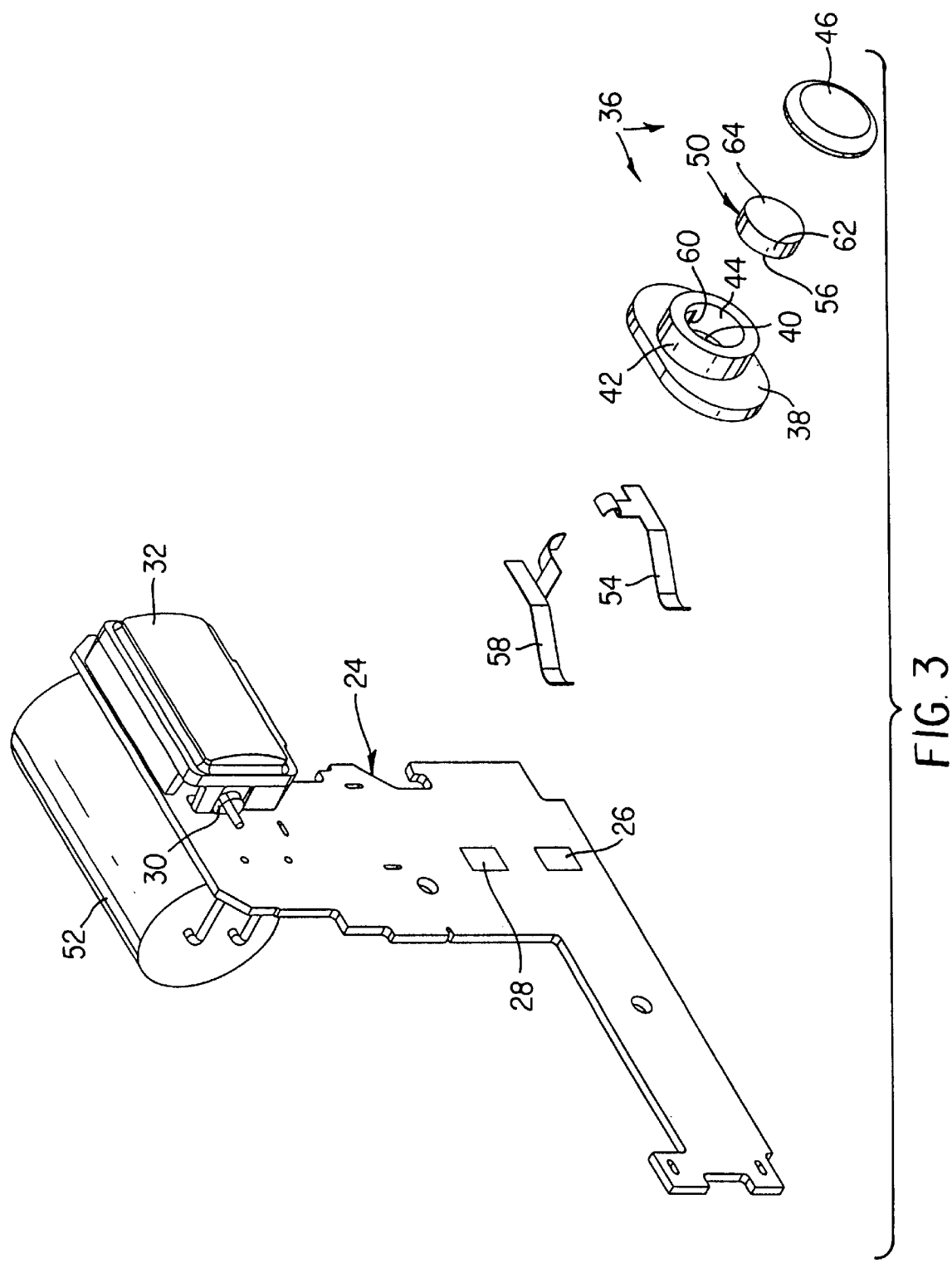
FIG. 3 is a front fully-exploded perspective view of the dual-function battery/manual operating button unit shown in FIG. 1.

Referring now to the drawings, FIGS. 1–3 show a first embodiment of the invention which is a camera 10 including a plastic opaque main body part 12, and a pair of plastic opaque front and rear housing parts 14 and 16 that contain the main body part.

A front lens and shutter mount 18 for a taking lens 20 and a known shutter blade (not shown), located behind the taking lens, is secured to the main body part 12. See FIG. 1. The taking lens 20 and the shutter blade are aligned over a front exposure opening (not shown) in the main body part 12. The shutter blade is supported for pivotal opening movement which uncovers the front exposure to begin a film exposure and for pivotal closing (reverse) movement which re-covers the front exposure opening to terminate the film exposure. The front housing part 14 has a front opening 22 for the taking lens.

A flash circuit board 24 is secured to the main body part 12 and includes a pair of electrical contact pads 26 and 28 that are fixed in place on the flash circuit board. See FIGS. 1 and 3. A known flash tube 30, connected to the flash circuit board 24, is located behind a known flash emission cover-lens 32. The cover-lens 32 slightly protrudes outwardly from a front opening 34 in the front housing part 14.

A non-conductive flash on-off button 36 includes a rear flat portion 38 having a hole 40, a front collar portion 42 projecting from the flat portion around the hole to form an open-end chamber 44, and a separate front cap 46 that fits on the collar portion to close one end of the chamber. See FIG. 3. The flat portion 38 is captured between the front cover part 14 and the flash circuit board 18, and the collar portion 42 substantially protrudes outwardly from an elongate opening 48 in the front housing part 14, to support the flash on-off button 36 for manual movement forward in one direction and rearward in a reverse direction along the elongate opening, i.e. substantially to the left and to the right in FIGS. 1–3. The collar portion 42 is exteriorly accessible to one's finger in order to manually move the flash on-off button 36.

A disk-shaped power source battery 50 for providing the necessary voltage to a flash firing capacitor 52 on the flash circuit board 18 is located in the chamber 44 to be simultaneously moved with the flash on-off button 36 as a manually movable unit. See FIG. 3. One resilient electrical lead 54 extends through the hole 40 in the flat portion 38 and into continuous conductive contact with a rear positive (+) face 56 of the battery 50 in the chamber 44. Another resilient electrical lead 58 extends through a hole 60 in the collar portion 42 and into continuous conductive contact with a negative (−) periphery 62 of the battery 50 in the chamber 44. When the flash on-off button 42 and the battery 50 are manually moved in the one direction substantially to the left in FIGS. 1–3, the respective leads 54 and 58 are moved into contact with the pads 26 and 28 to provide the necessary voltage to the flash firing capacitor 52. A return spring, not shown, can be included to urge the flash on-off button 42 to return in the reverse direction, substantially to the right in FIGS. 1–3, to separate the respective leads 54 and 58 from the pads 26 and 28.

Figure 4:
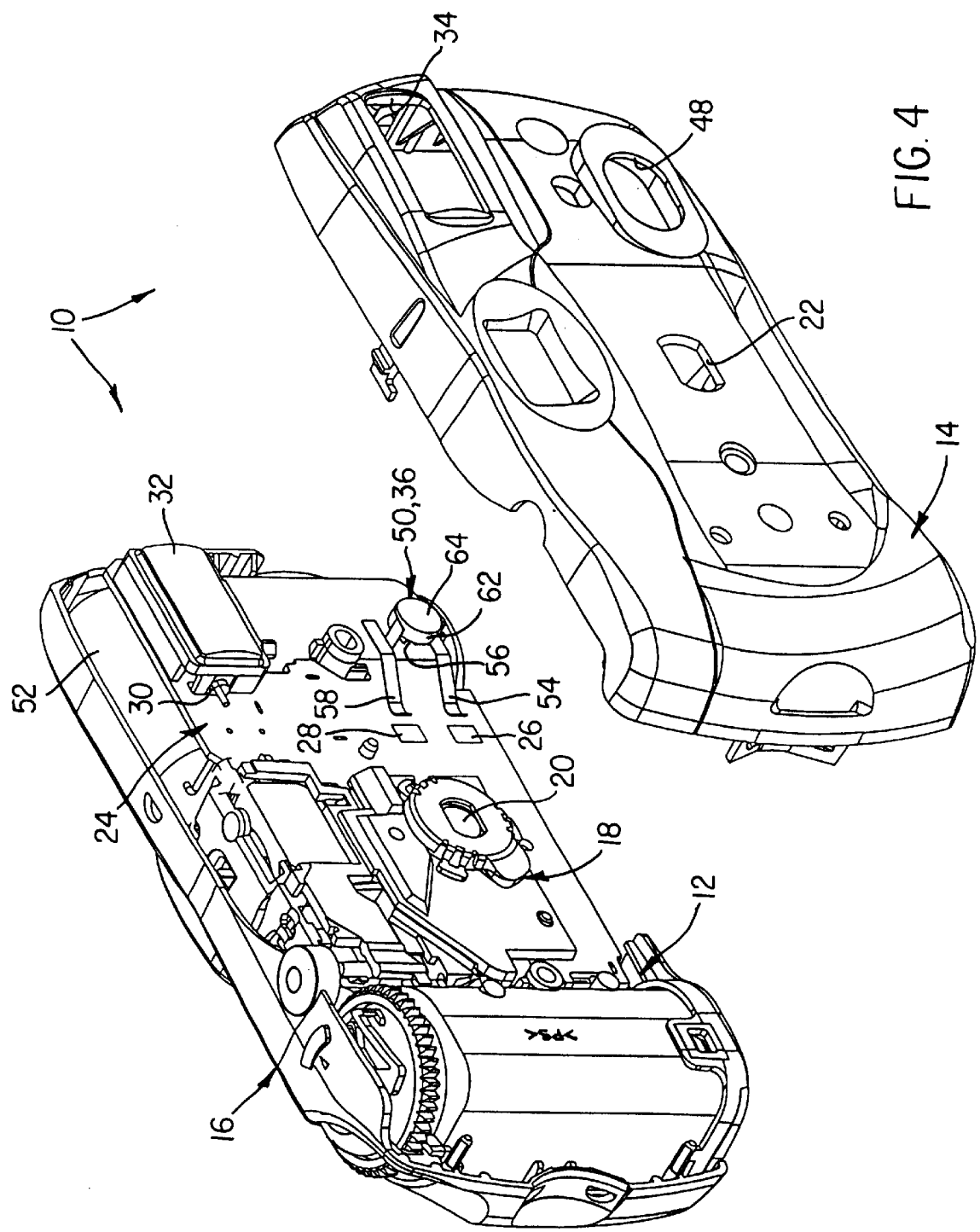
FIG. 4 is an front partially-exploded perspective view of the camera with an alternative battery/manual operating button unit.

Alternatively in FIG. 4, the flash on-off button 42 is not included. Instead, the power source battery 50 alone (without the flash on-off button 42) ( can be manually moved in the one direction, substantially to the left in FIG. 4, to move the respective leads 54 and 58 into contact with the pads 26 and 28, and returned in the reverse direction, substantially to the right in FIG. 4, to separate the respective leads and from the pads. The battery 50 would be exteriorly accessible to one's finger in order to be manually moved along the elongate opening 48, and would have a non-conductive cover pad (not shown) adhered to a front face 64 of the battery. Thus, the battery 50 itself can serve as a flash on-off button.

Figure 5:
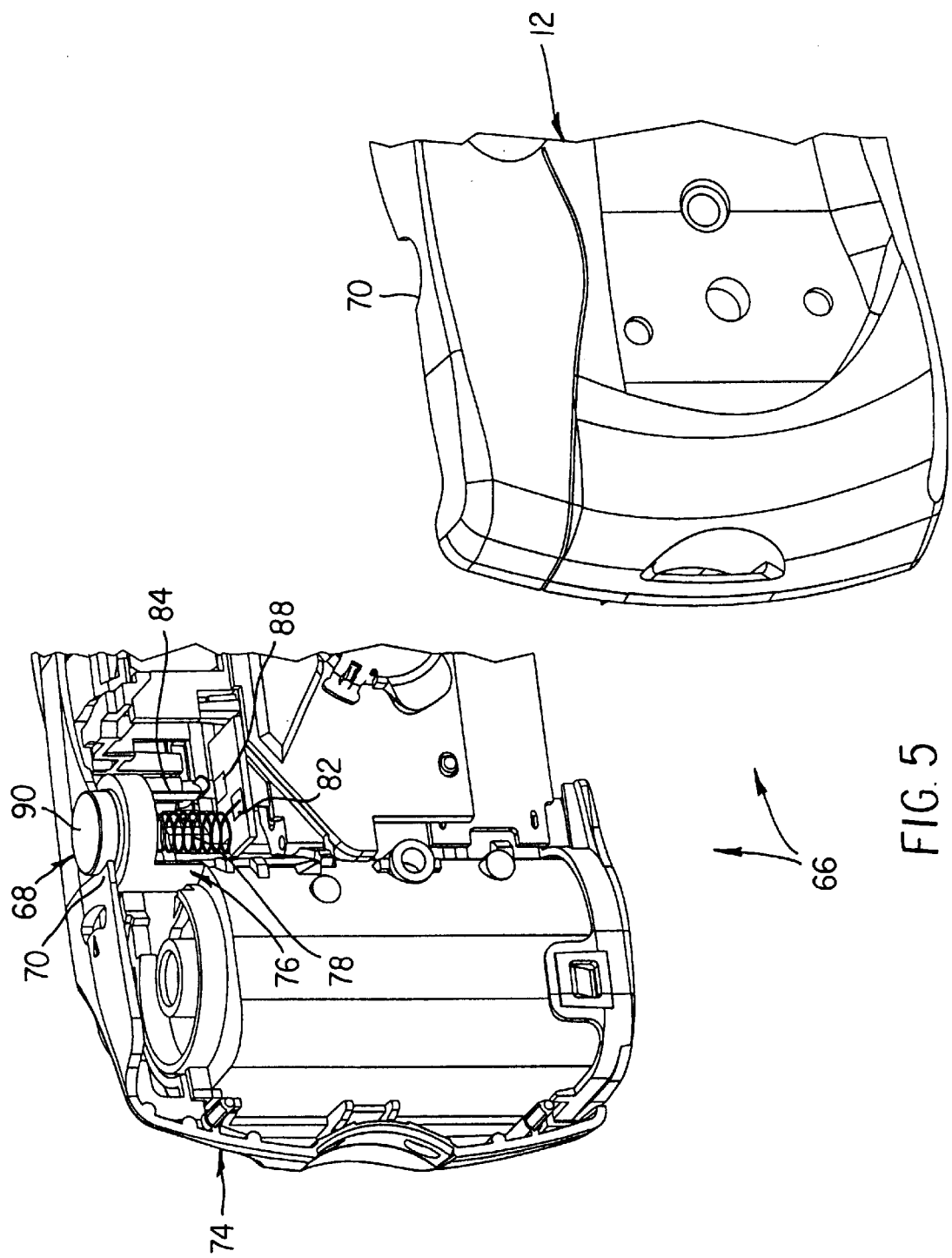
FIG. 5 is a front partially-exploded perspective view of a camera including a dual-function battery/manual operating button unit according to a another embodiment of the invention.
Figure 6:
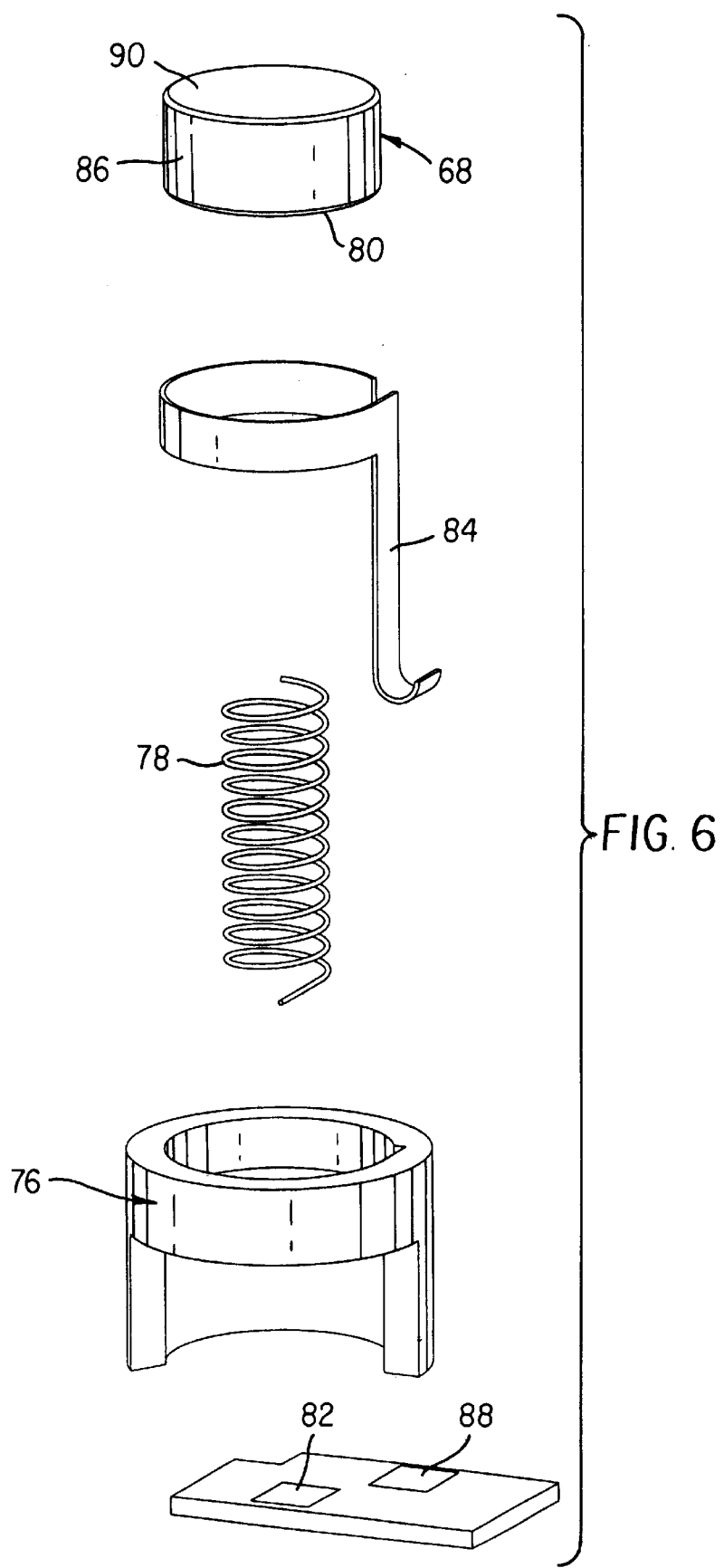
FIG. 6 is a front partially-exploded perspective view of the camera, shown partially cut away to see the dual-function battery/manual operating button unit.

FIGS. 5 and 6 show a second embodiment of the invention which is a camera 66 including a power source battery 68 used to provide the necessary voltage for a known exposure control (not shown) and/or automatic focus control (not shown). The battery 68 is button-shaped to further serve as a shutter release button, and slightly protrudes outwardly from a top opening 70 in a pair of front and rear housing parts 72 and 74 to be exteriorly accessible by one's finger. A main body part 76 within the front and rear housing parts 72 and 74 supports the battery 68 to be manually depressed in one direction into the top opening 70 to trigger shutter opening and to be returned in a reverse direction. One electrical lead is a return spring 78 in continuous conductive contact with a bottom positive (+) face 80 of the battery 68 to urge the battery into the top opening 70, and in continuous conductive contact with a fixed electrical contact pad 82 of the known exposure control and/or automatic focus control. Another electrical lead 84 is in continuous conductive contact with a negative (−) periphery 86 of the battery 68, and is normally spaced from a second electrical contact pad 88 of the known exposure control and/or automatic focus control. When the battery 68 is initially depressed into the top opening 70, the lead 84 is moved into contact with the second pad 88 prior to triggering shutter opening to provide the necessary voltage to the known exposure control and/or automatic focus control. The battery 68 has a non-conductive cover pad (not shown) adhered to a top face 90 of the battery.

Alternatively, the battery 66 can be located in a chamber in a shutter release button (not shown) similar to the way the battery 60 is contained in the chamber in the flash on-off button 36.

The invention has been described with reference to a preferred embodiment. However, it will be appreciated that variations and modifications can be effected by a person of ordinary skill in the art without departing from the scope of the invention.

PARTS LIST 10. camera
12. main body part
14. front housing part
16. rear housing part
18. front lens and shutter mount
20. taking lens
22. front opening
24. flash circuit board
26. electrical contact pad
28. electrical contact pad
30. flash tube
32. flash emission cover-lens
34. front opening
36. flash on-off button
38. rear flat portion
40. hole
42. front collar portion
44. open-end chamber
46. front cap
48. elongate opening
50. power source battery
52. flash firing capacitor
54. electrical lead
56. rear positive (+) face
58. electrical lead
60. hole
62. negative (−) periphery
64. front face
66. camera
68. power source battery
70. top opening
72. front housing part
74. rear housing part
76. main body part
78. electrical lead/return spring
80. bottom positive (+) face
82. electrical contact pad
84. electrical lead
86. negative (−) periphery
88. second contact pad
90. top face

What is claimed is:

1. A camera comprising a power source battery, and an exteriorly accessible operating button that is manually moveable in one direction to initiate at least one operation in the camera and is returnable in a reverse direction, is characterized in that:

said battery and said operating button are a simultaneously movable unit in the one direction and the reverse direction; and a pair of electrical leads within said camera maintain individual conductive contact with said battery when the battery and the button are simultaneously moved in the one direction and the reverse direction.

2. A camera as recited in claim 1, wherein said battery and said operating button are a single one-piece entity.

3. A camera as recited in claim 1, wherein said battery is button-shaped and is said operating button.

4. A camera as recited in claim 1, wherein said operating button has a chamber, and said battery is located in said chamber.

5. A camera as recited in claim 1, wherein a housing has a front opening for a taking lens and another opening to exteriorly access said movable unit.

6. A camera as recited in claim 5, wherein said other opening in said housing to exteriorly access said movable unit is a front opening in said housing.

7. A camera as recited in claim 5, wherein said other opening in said housing to exteriorly access said movable unit is a top opening in said housing.

8. A camera comprising an exteriorly accessible operating button that is manually moveable in one direction to initiate at least one operation in the camera and is returnable in a reverse direction, is characterized in that:

said operating button is a power source battery; and a pair of electrical leads within said camera maintain individual continuous contact with said battery when said operating button is manually moved in the direction and returned in the reverse direction.

9. A camera as recited in claim 8, wherein said operating button besides being a battery is a shutter release button.

10. A camera as recited in claim 8, wherein said operating button besides being a battery is a electronic flash on-off button.

11. A camera comprising a power source battery, and a housing having an opening, is characterized in that said battery is supported to be exteriorly accessible at said opening and to be manually moved in one direction within said opening to initiate at least one operation in the camera and is returned in a reverse direction within said opening, and a pair of electrical leads maintain individual conductive contact with said battery when said battery is manually moved in one direction within said opening to initiate at least one operation in the camera and is returned in a reverse direction within said opening.

12. A camera as recited in claim 11, wherein a pair of electrical contact pads are fixed in place, and said electrical leads are connected to said battery to be moved with said battery into and out of contact with said respective pads.

13. A camera as recited in claim 11, wherein one of said electrical leads is a spring that urges said battery to said opening.

* * * * *